June 12, 1934.  W. L. MORRIS  1,962,254

LUBRICANT NIPPLE

Original Filed Aug. 7, 1916

INVENTOR
BY William L. Morris
Clinton S. Janes
ATTORNEY

Patented June 12, 1934

1,962,254

UNITED STATES PATENT OFFICE 1,962,254

LUBRICANT NIPPLE

William L. Morris, Chicago, Ill., assignor, by mesne assignments, to The Lubrication Corporation, South Bend, Ind., a corporation of Delaware Original application August 7, 1916, Serial No. 113,653, now Reissue Patent No. 18,123, dated July 7, 1931. Divided and this application March 5, 1930, Serial No. 433,381

26 Claims. (Cl. 184—105)

This invention relates to lubricant nipples and more particularly to lubricant conducting elements adapted to be mounted on lubricant receiving members and to make lubricant tight connection with a detachable lubricant feeder.

This application is a division of an application for Grease feeders, Serial Number 113,653, filed by the present applicant on August 7, 1916, (now Reissue Patent #18,123), and concerns particularly the form of lubricator attachment there shown for connecting the grease feeder with the elements to be lubricated.

The connection to which a grease feeder is attached should permit of connection from any one of several angles on account of the many positions in which cups are placed on a car. The form of grease feeder should be such that an exact alinement of the feeder is not necessary in order to make the connection; the form of grease feeding connection should be one which will permit a considerable movement of the grease feeding device without imposing too great a strain on the small connections of the grease cups. The attachments for the grease cups should be uniform in size so that the feeder can readily be attached thereto regardless of the size or make of the grease cup itself. Moreover to prevent grease from escaping at the connecting members it is necessary to have a self-closing valve so that any confined pressure in the bearing will not eject grease when the parts are separated, or when the joint is disconnected. These are only a few of the requirements for a successful grease feeder and the present device is believed to answer all these requirements and many others as will hereinafter be set forth.

One object of the present invention is to provide a novel lubricant nipple adapted to make a tight connection with a feeder nozzle while allowing relative angular movement therebetween.

Another object is to provide a lubricant nipple having a nozzle engaging part which is adapted to allow universal movement of the nozzle.

A further object of the invention is the provision of a novel integral nipple for lubricant feeders.

Another object is the provision of a novel angular nipple for lubricant feeders which may be readily formed from a single piece of stock.

A further object is to provide a novel angular lubricant nipple having an integral nozzle engaging part adapted to form a sealed connection with a nozzle while allowing universal relative movement.

Further objects and advantages will be apparent to those skilled in the art from the following description taken in connection with the accompanying drawing in which.

Figure 1:
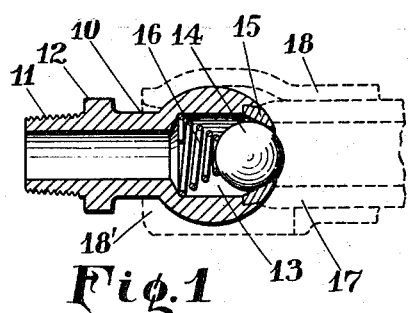
Fig. 1 is a longitudinal section of one form of the invention.

Referring first to Fig. 1 of the drawing, an end ported fitting or nipple 10 is clearly shown having a threaded connecting end 11, and a hexagonal portion 12 for attaching it. In the port 13 is a ball valve 14 which is pressed against a valve seat 15 inserted in the end of the port, by a spring 16. The seat 15 may be retained in the end of the port by any suitable means as by being spun therein as shown, or obviously may be formed as an integral lip if so desired.

A cooperating nozzle element is indicated in dotted lines at 17 which may be provided with a suitable contacting surface to cooperate with the spherical contact surface of the fitting 10. A guiding and clamping element 18 may also be provided for locating and holding the nozzle against the nipple.

Figure 2:
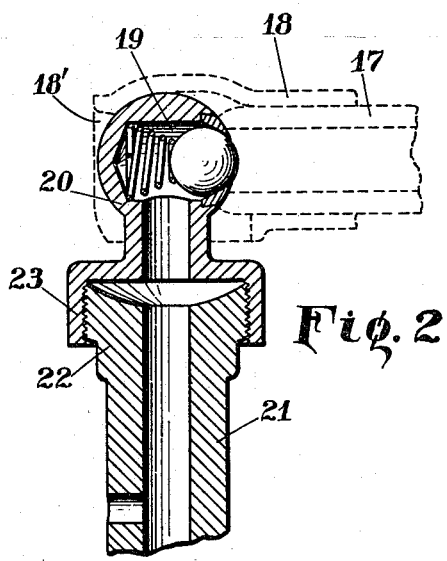
Fig. 2 is a longitudinal section of a second form of the invention in which the inlet opening is at right angles to the shank.
Figure 4:
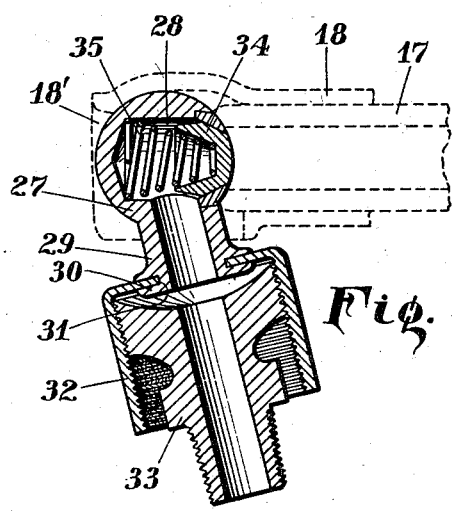
Fig. 4 is a similar view of another form of the invention as applied to a grease cup.
Figure 3:
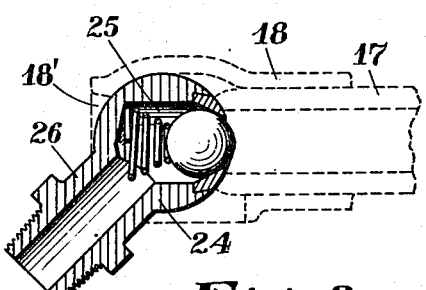
Fig. 3 is a similar view of a form of the invention similar to Fig. 1 but with the inlet opening at an obtuse angle to the shank of the nipple.

In Figs. 2, 3, and 4 different forms of ball fittings are shown. In Fig. 2 the port 19 of the ball or spherical fitting 20 is at the side thereof. Numeral 21 designates generally a pin or bearing for receiving lubricant, with a grease cup end 22 threaded into a fitting end 23. In Fig. 3 a nipple member 24 is similar to the fitting shown in Fig. 1 with the exception that the port 25 is at an angle of approximately 45 degrees with the extended axis of the shank 26 of the nipple.

In Fig. 4 the ball fitting 27 has a port 28 at a special acute angle with the shank 29 of the nipple, and has its lower end 30 headed over and around an opening 31 in a standard grease cup cap 32. The stationary part of the grease cup is designated at 33. In this last construction is a formed valve 34 and a pointed spring 35 bearing inside of the valve.

These modified forms are shown as they can all be used with a clamping device, the spherical form being superior to others as it allows connection from almost any angle, and is easily cleaned or wiped off. Furthermore a slight movement of the grease feeder is permissible with the spherical fitting without placing a strain on the fitting; the clamping member will slip on the ball up to a point such that it bears on the neck; the neck however, is considerably smaller than the opening 18' in the clamping member 18.

Although the feeder nozzle is rigid, i. e., incapable of bending to clear obstructions, great flexibility in use is obtained by the variable angle of attachment which is made possible by locating the port holes at the various angles on the grease receiving fittings. This flexibility is different and separate from that produced by a flexible conduit, but it enables an operator to engage fittings and to avoid obstructions which would otherwise render the fittings difficult of access.

Although certain embodiments of the invention have been shown and described, it will be understood that these embodiments are not exclusive but that the invention is capable of other embodiments and that various modifications may be made in the form and structure thereof without departing from the spirit of the invention.

Reference is therefore to be had to the claims appended hereto for a definition of the scope of the invention.

What is claimed is:—

1. A lubricant nipple including a hollow shank adapted to be securely attached to an element to be lubricated, a ball-shaped head connected with said shank and having an inlet opening communicating with the interior of said shank and an unbroken surface surrounding said inlet adapted to make a lubricant tight fit with a feeder nozzle over a relatively wide angle of relative movement.

2. In a lubricant nipple including a hollow shank adapted to be attached to an element to be lubricated, a substantially spherical head on said shank, said head being provided with an unobstructed surface and having an inlet opening therein, the surface of said head surrounding said inlet adapted to make a lubricant tight universal connection with a feeder nozzle.

3. A lubricant nipple including a hollow shank adapted to be attached to an element to be lubricated, a spherical head formed integral with said shank having an inlet opening therein arranged at an angle less than a straight angle to the axis of said shank, and a surface surrounding said inlet adapted to make a lubricant tight fit with a feeder nozzle regardless of angular movement between the nozzle and feeder.

4. A lubricant nipple of the character described comprising, a shank and a head, said nipple being necked in between said shank and head, said head having a spherical surface surrounding and extending from said neck juncture to the transverse diameter of said head, said head, necked portion and shank having communicating passages therethrough, said head having a circular contact portion surrounding the opening to the passage therethrough, said portion and surface being generated from substantially the same center.

5. A lubricant nipple having a hollow shank adapted to be securely attached to an element to be lubricated, a round head on said shank having an inlet opening therein at an angle to the axis of said shank and a curved contact portion surrounding said opening adapted to make a universal lubricant tight fit with a feeder nozzle.

6. A lubricant nipple comprising, a hollow shank for attachment to an element to be lubricated, a generally globular head provided with an unobstructed surface and having an inlet opening therein, a nozzle engageable portion encircling said opening, and a portion of less transverse area than said head to provide a neck joining said head and shank and spacing the same apart, said neck portion having a passage therethrough providing communication between the interior of said hollow shank and said inlet opening, said head having a substantially spherical surface surrounding said neck and extending for a substantial distance from the neck toward a transverse diametral plane of the head.

7. A lubricant nipple formed from a single piece of stock comprising a hollow shank adapted to be securely attached to an element to be lubricated, and a head having an inlet surrounded by a relatively large curved contact portion adapted to make universal lubricant tight connection with a feeder nozzle.

8. A lubricant nipple comprising, a hollow shank for attachment to an element to be lubricated, a generally globular head provided with an unobstructed surface and having an inlet opening therein, and a portion of less transverse area than said head joining said head and shank and said portion having a passage therethrough providing communication between the interior of said hollow shank and said inlet opening, said head having a substantially spherical surface surrounding said portion and extending for a substantial distance from said portion toward a transverse diametral plane of the head, said head having a surface including a portion providing a circular line of contact for a servicing nozzle, said circular line of contact surrounding said inlet opening and lying between said inlet opening and said diametral plane, said surface and said circular line having a common center of generation.

9. A lubricant nipple formed from a single piece of stock comprising a shank adapted to be securely attached to an element to be lubricated, a head having an inlet surrounded by a relatively large contact surface adapted to make universal lubricant tight connection with a feeder nozzle, and a check valve in said inlet adapted to prevent escape of lubricant, said head having a valve seat therefor adjacent the inlet opening.

10. A nipple comprising, a head and neck, said head having an unobstructed surface including a spherical surface of substantial area adjacent said neck and a contact surface on the opposite side of the center of said sphere from said neck and contained in the sphere containing said spherical surface.

11. In a lubrication fitting, a shank portion adapted for connection to a member to be lubricated and a ball-shaped head portion connected with said shank portion, said head and shank portions having a lubricant passage therethrough, said head portion having a contact surface devoid of projections surrounding the opening to the passage therethrough for substantially universal sliding engagement with a conforming end of a feeder nozzle to form a seal therewith, and a check valve disposed within the passage in said head and adapted to close said opening.

12. A lubricant nipple including a hollow shank adapted to be securely attached to an element to be lubricated, a substantially spherical head having an inlet opening arranged at an angle to the axis of said shank, and a neck portion joining said head and shank, said neck being of less area in transverse cross-section than said head, the surface of said head being adapted for substantially universal contact over its area with a lubricant feeder nozzle.

13. A lubricant nipple including a hollow shank adapted to be securely attached to an element to be lubricated, a substantially spherical head having an inlet opening arranged to provide communication with the hollow interior of said shank, and a neck portion joining said head and shank, said neck being of less area in transverse cross-section than said head, the surface of said head being adapted for substantially universal contact over its area with a lubricant feeder nozzle.

14. A lubricating fitting of the character described comprising a shank, a head and a neck joining said shank and head, any overall transverse dimension of the neck adjacent to said head being less than a corresponding overall dimension of either said head or shank, said head, neck and shank having intercommunicating lubricant passages therethrough, and said head having a convexly spherical contact surface of substantial area surrounding the opening into the passageway therethrough.

15. As an article of manufacture a lubricating fitting of the character described for attachment to bearings and the like comprising integral head and shank portions, said head portion being ball-shaped and having a surface entirely of spherical contour substantially to the juncture thereof with said shank for substantially universal engagement with a nozzle said head and shank having communicating passages therethrough.

16. A lubricant nipple including a hollow shank adapted to be securely attached to an element to be lubricated, and a substantially spherical head having an inlet opening to the interior thereof and communicating with the hollow interior of said shank, the head having an unbroken contact surface extending about and for a minimum of substantially 90° in all directions away from the perimeter of said opening for substantially universal engagement with a lubricant feeder nozzle.

17. A lubricant nipple including a hollow shank adapted to be securely attached to an element to be lubricated, a substantially spherical head having an inlet opening to the interior thereof and communicating with the hollow interior of said shank, the head having an unbroken contact surface extending about and for a minimum of substantially 90° in all directions away from the perimeter of said opening for substantially universal engagement with a lubricant feeder nozzle, and a valve in said head for closing said opening, said valve at its upper limit in said opening being substantially flush with said surface.

18. A lubricant nipple of the character described comprising a hollow shank adapted at one end to be securely attached to an element to be lubricated, a substantially globular head having a passageway therethrough communicating with the hollow interior of said shank and opening at the surface of said head, the surface of said head surrounding said opening being of spherical contour for sliding engagement with a nozzle having a conforming contact portion, and a valve in said head for closing said opening, the outer end edges of said valve lying substantially flush with the edges of said surface about said opening.

19. A lubricant nipple of the character described comprising a hollow shank adapted at one end to be securely attached to an element to be lubricated, a substantially globular head having a passageway therethrough communicating with the hollow interior of said shank and opening at the surface of said head, the surface of said head surrounding said opening being of spherical contour for sliding engagement with a nozzle having a conforming contact portion, and a valve in said head for closing said opening, the outer end of said valve having a surface shaped substantially to conform to and to form a continuation of said spherical contour of said head surface.

20. A lubricant nipple for pressure lubrication and adapted to be inserted in an opening between engaging surfaces of a clamping device including a lubricant feeder nozzle comprising, a rounded head having an inlet opening formed therein, said head providing a smooth spherical contact surface for universal lubricant tight engagement with the nozzle and being of a size sufficiently small to be inserted within the opening between said engaging surfaces, said spherical contact surface being relatively large compared to said inlet opening.

21. A lubricant nipple for pressure lubrication adapted to be inserted in an opening between contact surfaces of a clamping device including a lubricant feeder nozzle comprising, a rounded head having an inlet opening formed therein, the surface of said head forming a seal effecting contact area and being spherical in outline for substantially one-half of a sphere.

22. A lubricant nipple for pressure lubrication and for attachment in bearings and the like, comprising integral head and shank portions spaced and joined by a neck, said head portion being globular in shape and having an unobstructed clamp-engageable surface of spherical contour substantially to the juncture thereof with said neck and extending throughout substantially half of a sphere, said head, neck and shank having communicating passages therethrough.

23. A lubricant nipple for pressure lubrication and adapted to be inserted in an opening between contact surfaces of a clamping device including a lubricant feeder nozzle comprising, a rounded head having an inlet opening formed therein and a seal-effecting contact surface extending thereover from the margin about said opening, the contact surface of said head comprising a zone of a sphere greater than one-half of a sphere.

24. A lubricant fitting including a hollow shank adapted to be secured to an element to be lubricated, one end of the fitting having a lubricant receiving opening therethrough, a reduced neck joining said end and shank and having a passage therethrough connecting said opening with the hollow interior of said shank, said end being enlarged and provided with a spherically convex contact surface of appreciable width surrounding and extending to the marginal edge at said opening for sealing engagement with a lubricant supply nozzle, said end having a substantial unobstructed spherical portion adjacent to and surrounding said neck for engagement with a clamp associated with said nozzle.

25. A lubricant nipple for pressure lubrication of bearings and the like, comprising a shank portion adapted to be attached to a member to be lubricated, a connection portion for engagement by a lubricant supply nozzle, and a reduced neck portion supporting said connecting portion in spaced relation to said shank, said connection, neck and shank portions having communicating passages therethrough, said connection portion providing an enlarged head having a contact portion surrounding the opening to the passage therethrough whereby to make a lubricant tight seal with a supply nozzle over a range of axial relationships between the nipple and nozzle, said head having an unobstructed spherically convex surface surrounding and extending a substantial distance about the head from the juncture of the head and neck for engagement with a lubricant servicing clamp.

26. A lubricant nipple including head and shank portions connected by an intermediate reduced portion, said head, reduced portion and shank having a lubricant passageway therethrough, said head having an inlet opening to said passageway and being substantially convexly spherical in surface contour over a substantial portion of its area from and surrounding its juncture with said reduced portion and having a seal effecting contact portion surrounding said inlet opening for making a lubricant tight connection with a lubricant supply nozzle over a range of angular relationships with respect thereto.

WILLIAM L. MORRIS.